(12) United States Patent
Ishimura et al.

(10) Patent No.: US 10,666,362 B2
(45) Date of Patent: May 26, 2020

(54) OPTICAL TRANSMISSION SYSTEM, PON SYSTEM, AND TRANSMISSION METHOD

(71) Applicant: KDDI CORPORATION, Tokyo (JP)

(72) Inventors: Shota Ishimura, Fujimino (JP); Kazuki Tanaka, Fujimino (JP); Kosuke Nishimura, Fujimino (JP); Masatoshi Suzuki, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 16/429,560

(22) Filed: Jun. 3, 2019

(65) Prior Publication Data
US 2019/0288777 A1    Sep. 19, 2019

Related U.S. Application Data

(63) Continuation of application No. PCT/JP2017/045658, filed on Dec. 20, 2017.

(30) Foreign Application Priority Data

Jan. 10, 2017  (JP) .................... 2017-002200

(51) Int. Cl.
*H04B 10/54* (2013.01)
*H04B 10/2513* (2013.01)
(Continued)

(52) U.S. Cl.
CPC .............. *H04B 10/54* (2013.01); *G02F 1/01* (2013.01); *H04B 10/2513* (2013.01);
(Continued)

(58) Field of Classification Search
CPC .. H04B 10/54; H04B 10/548; H04B 10/2513; H04J 14/02
See application file for complete search history.

(56) References Cited

U.S. PATENT DOCUMENTS 5,926,275 A * 7/1999 Sanders ............... G01C 19/728
356/464
7,065,298 B1   6/2006 Munroe et al.
(Continued)

FOREIGN PATENT DOCUMENTS

DE    19628321 C1    1/1998
EP     1953933 A1    8/2008
(Continued)

OTHER PUBLICATIONS

International Search Report for PCT/JP2017/045658 dated Mar. 6, 2018 (partially translated).
(Continued)

*Primary Examiner* — Dzung D Tran
(74) *Attorney, Agent, or Firm* — Thomas = Horstemeyer, LLP

(57) ABSTRACT

An optical transmission system in which a transmitting station and a plurality of receiving stations are connected via an optical splitter, wherein the transmitting station includes: a controller configured to determine whether to perform intensity modulation or phase modulation on optical signals based on information on transmission distances to the receiving stations and modulation bands; an intensity modulator configured to perform intensity modulation on an optical signal; and a phase modulator configured to perform phase modulation on an optical signal, and wherein one of an intensity modulation signal and a phase modulation signal is transmitted from the transmitting station to each of the receiving stations.

9 Claims, 10 Drawing Sheets

(51) Int. Cl.
*H04B 10/272* (2013.01)
*H04B 10/548* (2013.01)
*H04J 14/00* (2006.01)
*H04J 14/02* (2006.01)
*G02F 1/01* (2006.01)
*H04B 10/516* (2013.01)

(52) U.S. Cl.
CPC ......... *H04B 10/272* (2013.01); *H04B 10/516* (2013.01); *H04B 10/548* (2013.01); *H04J 14/005* (2013.01); *H04J 14/023* (2013.01); *H04J 14/0245* (2013.01)

(56) References Cited

U.S. PATENT DOCUMENTS

| | | | |
|---|---|---|---|
| 7,983,564 B2 | 7/2011 | Ooi et al. | |
| 9,979,472 B1* | 5/2018 | Wang | H04B 10/541 |
| 10,116,410 B2 | 10/2018 | Morsy-Osman et al. | |
| 2001/0053165 A1* | 12/2001 | Wang | B82Y 20/00 |
| | | | 372/38.02 |
| 2008/0199182 A1* | 8/2008 | Ooi | H04B 10/2513 |
| | | | 398/81 |
| 2011/0158653 A1* | 6/2011 | Mazed | H04B 10/272 |
| | | | 398/140 |
| 2011/0188108 A1* | 8/2011 | Kagaya | G02F 1/01 |
| | | | 359/245 |
| 2014/0133868 A1* | 5/2014 | Krause | H04B 10/5051 |
| | | | 398/184 |
| 2016/0291135 A1* | 10/2016 | Ando | G01S 17/58 |
| 2017/0230134 A1* | 8/2017 | Gavignet | H04B 10/506 |
| 2017/0250776 A1 | 8/2017 | Morsy-Osman et al. | |

FOREIGN PATENT DOCUMENTS

| | | |
|---|---|---|
| JP | 2003-527764 A | 9/2003 |
| JP | 2006-081014 A | 3/2006 |
| JP | 2012-105180 A | 5/2012 |
| JP | 5416844 B2 | 2/2014 |
| JP | 2016-051995 A | 4/2016 |
| WO | 2016/042535 A1 | 3/2016 |
| WO | 2018/131406 A1 | 7/2018 |

OTHER PUBLICATIONS

Extended European Search Report for EP Patent Application No. 17891947.8 dated Dec. 16, 2019.

* cited by examiner

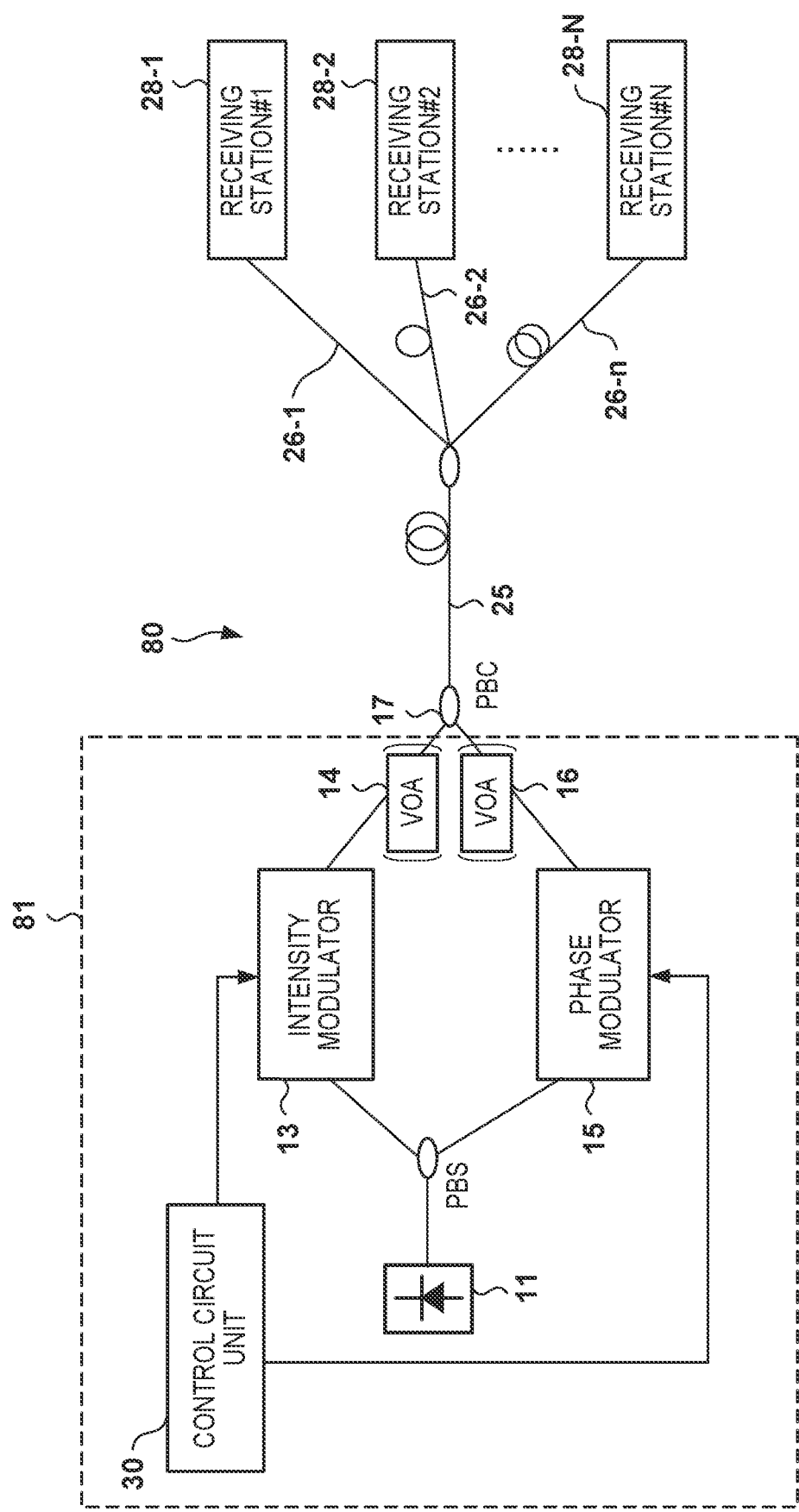

OPTICAL TRANSMISSION SYSTEM, PON SYSTEM, AND TRANSMISSION METHOD

CROSS-REFERENCE TO RELATED APPLICATIONS

This application is a continuation of International Patent Application No. PCT/JP2017/045658 filed on Dec. 20, 2017, which claims priority to and the benefit of Japanese Patent Application No. 2017-002200 filed on Jan. 10, 2017, the entire disclosures of which are incorporated herein by reference.

TECHNICAL FIELD

The present invention relates to an optical transmission system, a PON system, and a transmission method, including a wavelength dispersion compensation function for multi-carrier transmission, or according to which it is possible to avoid the influence of wavelength dispersion.

BACKGROUND ART

In optical fiber transmission, wavelength dispersion is one main factor that causes signal degradation. Compensation for wavelength dispersion needs to be performed optically, but in the case of using a method in which a dispersion compensation fiber that depends on the distance of the optical fiber is physically inserted, an increase in operational cost is incurred. Also, in the case of using a method of performing compensation through digital signal processing, an apparatus for performing digital signal processing is expensive, and therefore it has been difficult to use this method with an access line that is required to have a lower cost. Furthermore, in a network topology using a Point-to-MultiPoint (PtMP) scheme such as a PON (Passive Optical Network), in the case of performing compensation for wavelength dispersion of paths from an OLT (optical line terminal) to respective ONUs (optical network units), multiple dispersion compensation fibers corresponding to respective distances are needed.

PTL1 discloses a technique in which multiple wavelength dispersion compensators are included in an OLT and are switched between according to the distances of the ONUs.

CITATION LIST

Patent Literature

PTL1: Japanese Patent No. 5416844

SUMMARY OF INVENTION

Technical Problem

However, with an optical approach in the existing method for avoiding the influence of wavelength dispersion, separate dispersion compensators corresponding to the transmission distances are needed, and with an electrical approach, a high-cost circuit for performing signal processing is needed, and thus in order to apply either approach to an access network, there have been problems in terms of cost. Also, in network topology such as PtMP in a PON or the like, the distances between the OLT and the ONUs differ, and therefore it has been necessary to install a dispersion compensator in each of multiple routes with different cumulative dispersion amounts.

The present invention was made in view of these circumstances, and aims to provide an optical transmission system, a PON system, and a transmission method according to which it is possible to avoid the influence of wavelength dispersion using a simple configuration.

Solution to Problem

According to one aspect of the present invention, an optical transmission system in which a transmitting station and a plurality of receiving stations are connected via an optical splitter, wherein the transmitting station includes: a controller configured to determine whether to perform intensity modulation or phase modulation on optical signals based on information on transmission distances to the receiving stations and modulation bands; an intensity modulator configured to perform intensity modulation on an optical signal; and a phase modulator configured to perform phase modulation on an optical signal, and wherein one of an intensity modulation signal and a phase modulation signal is transmitted from the transmitting station to each of the receiving stations.

Advantageous Effects of Invention

According to the present invention, it is possible to avoid the influence of wavelength dispersion using a simple configuration.

Other characteristics and advantages of the present invention will become clear through the following description given with reference to the accompanying drawings. It should be noted that configurations that are the same or similar in the accompanying drawings are denoted by the same reference numbers.

BRIEF DESCRIPTION OF DRAWINGS

FIG. 9 is a diagram showing an overall configuration of an optical transmission system according to a sixth embodiment.

DESCRIPTION OF EMBODIMENTS

The inventors of the present invention achieved the present invention by noticing that the output powers of an intensity modulation signal and a phase modulation signal are in a complementary relationship, and finding out that signal degradation due to wavelength dispersion can be prevented and dispersion compensation can be eliminated by selectively using either intensity modulation or phase modulation based on information on the distances of transmission paths between a transmitting station and receiving stations and modulation bands, and as a result, communication is performed with all receiving stations always occupying a band.

Figure 1A:
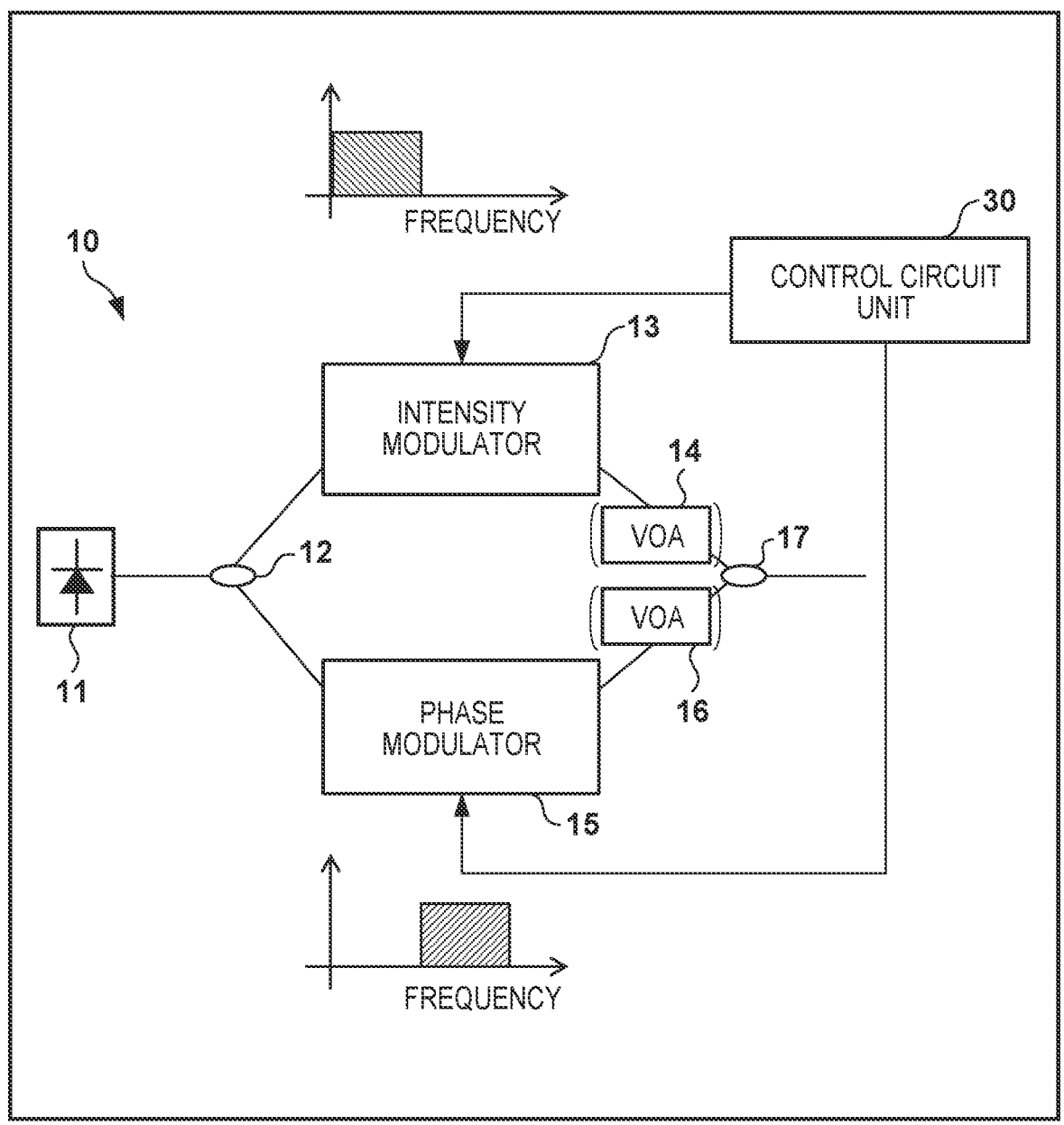
FIG. 1A is a diagram showing an overall configuration of an optical transmitter according to a first embodiment.

FIG. 1A is a diagram showing an overall configuration of an optical transmitter according to a first embodiment. An optical transmitter 10 is provided in a transmitting station in an optical transmission system or an OLT in a PON system, and includes a semiconductor laser (light source) 11 that outputs light, an optical splitter 12, an intensity modulator 13, a VOA (variable optical attenuator) 14, a phase modulator 15, a VOA 16, an optical multiplexer 17, and a control circuit unit 30.

The light output from the semiconductor laser 11 is split into two lights by the optical splitter 12, and one light is input to the intensity modulator 13, and the other light is input to the phase modulator 15. Also, the control circuit unit 30 determines whether the optical signals are to be subjected to intensity modulation or phase modulation based on the information on the transmission distances to the receiving stations in the optical transmission system and the modulation bands. In the case of being applied to a PON system, the control circuit unit 30 determines whether the optical signals are to be subjected to intensity modulation or phase modulation based on the information on the transmission distances between the OLT and the ONUs and the modulation bands. The optical signal modulated by one of the modulators is multiplexed by the optical multiplexer 17 via the VOA 14 and the VOA 16 and is output to the optical fiber. Note that here, an aspect has been indicated in which the VOA 14 and the VOA 16 are included, but the present invention is not limited thereto, and the VOA 14 and the VOA 16 are not needed in some cases as well.

Figure 1B:
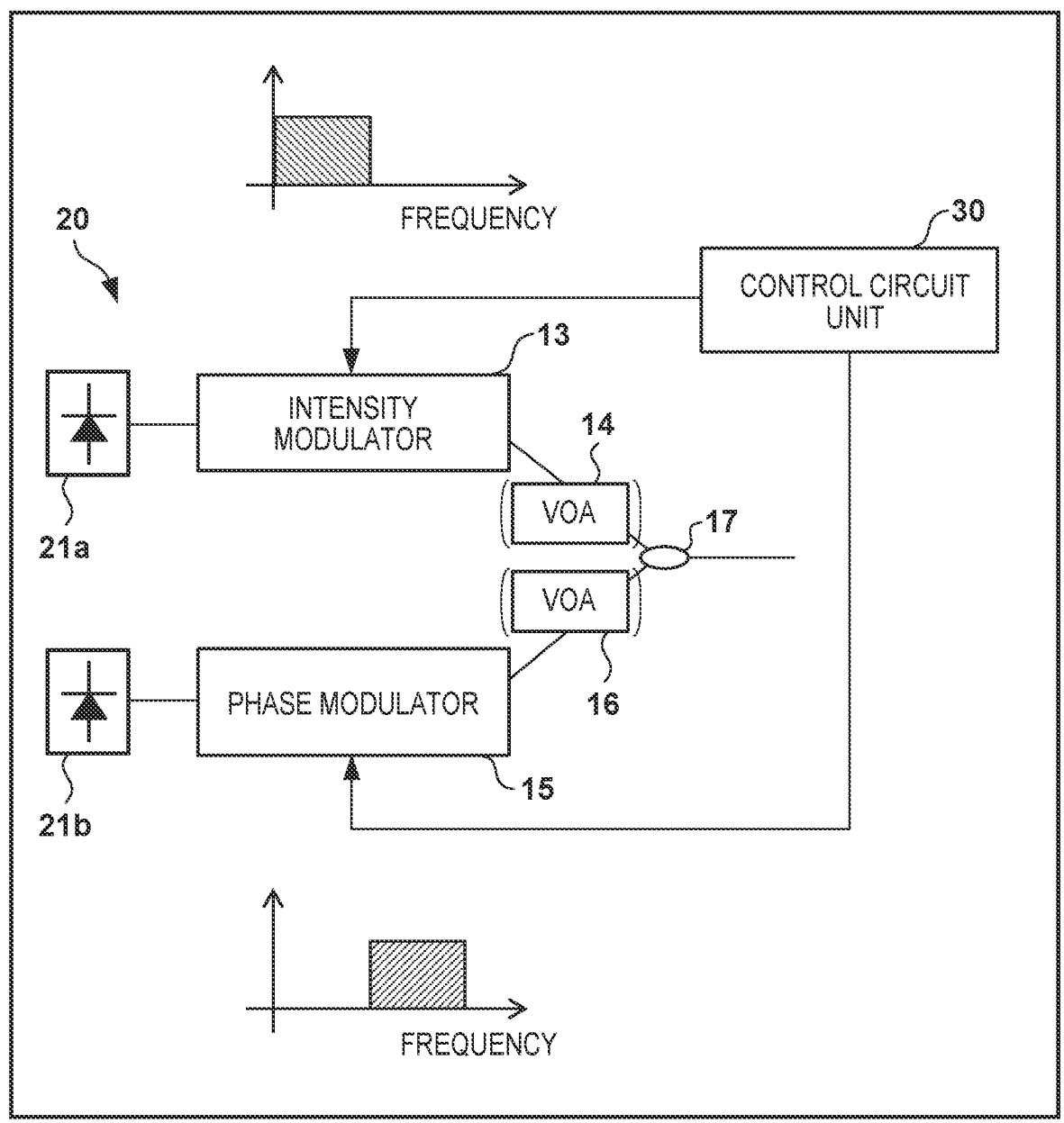
FIG. 1B is a diagram showing an overall configuration of another optical transmitter according to the first embodiment.

Note that as shown in FIG. 1B, it is also possible to employ a configuration in which two semiconductor lasers 21a and 21b are provided and light is input to the intensity modulator 13 and the phase modulator 15 from semiconductor lasers 21a and 21b. By using this kind of configuration, processing of only the multiplexing of light is performed, and thus it is possible to suppress the occurrence of polarization cross-talk.

Figure 2:
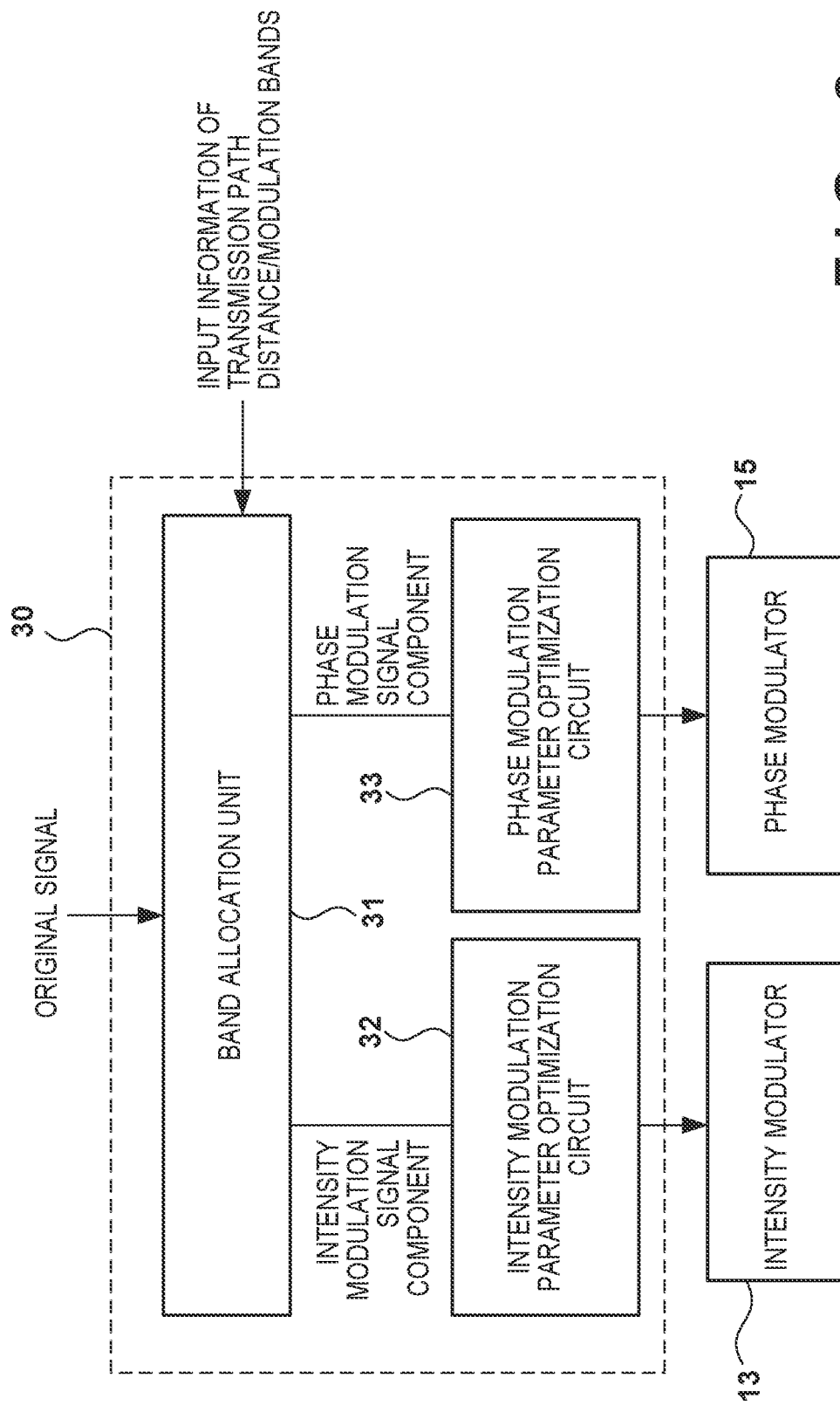
FIG. 2 is a block diagram showing functions of a control circuit unit.

FIG. 2 is a block diagram showing functions of a control circuit unit 30. The control circuit unit 30 includes a band allocation unit 31, an intensity modulation parameter optimization circuit 32, and a phase modulation parameter optimization circuit 33. An original signal (electric signal) is input to the band allocation unit 31, and if the system applied is an optical transmission system, information on the distances of the transmission paths from the transmitting station to the receiving stations and the modulation bands is input to the band allocation unit 31. If the system applied is a PON system, information on the transmission paths from the OLT to the ONUs and the modulation bands is input. The band allocation unit 31 determines whether the frequency band of an optical signal to be used in the optical transmission system or the PON system according to the present embodiment is to be subjected to intensity modulation or to phase modulation. The signal component for intensity modulation is input to the intensity modulation parameter optimization circuit 32, the signal component for phase modulation is input to the phase modulation parameter optimization circuit 33, and in each, the required parameters are optimized. Thereafter, the optimized signals are input to the intensity modulator 13 and the phase modulator 15 respectively.

Figure 3:
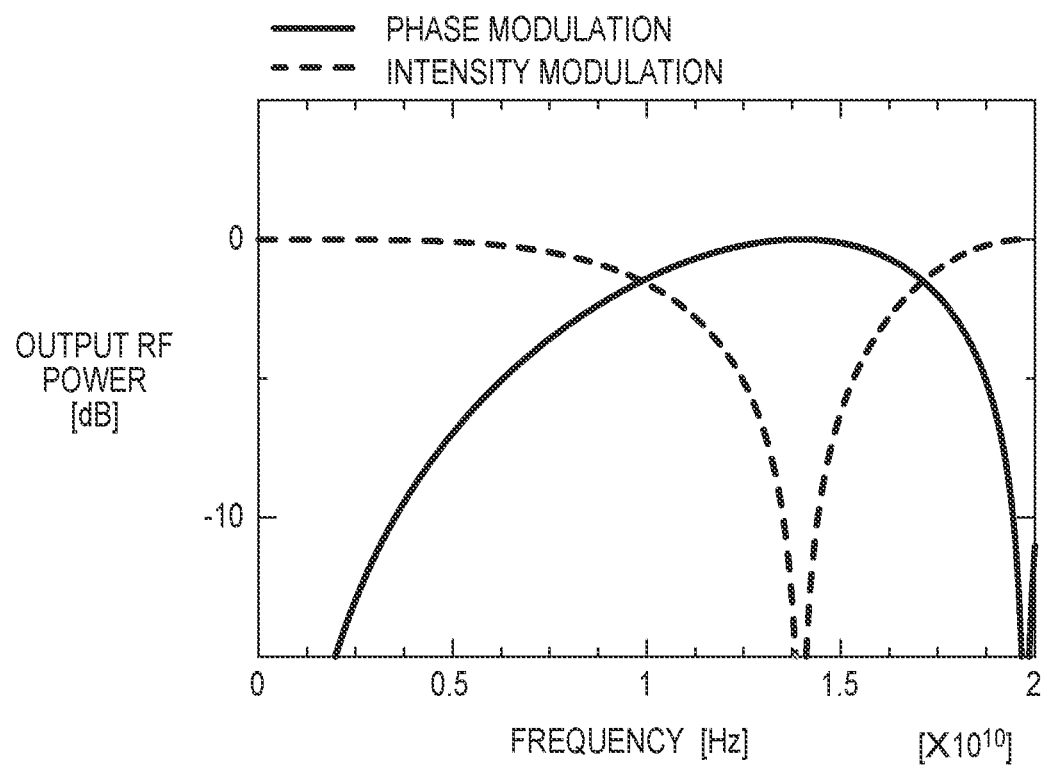
FIG. 3 is a diagram showing output RF powers of optical signals that were respectively subjected to intensity modulation and phase modulation and were directly detected after being transmitted 20 km through optical fibers, the output RF powers being normalized at maximum values.

FIG. 3 is a diagram showing output RF powers of optical signals that were respectively subjected to intensity modulation and phase modulation and were directly detected after being transmitted 20 km through optical fibers, the output RF powers being normalized at maximum values. As shown in FIG. 3, after being transmitted 20 km, a constant output is attained for the output RF power of the signal subjected to intensity modulation until a modulation frequency of about 10 GHz, whereafter the output RF power gradually attenuates and almost reaches 0 near a modulation frequency of 14 GHz. Thereafter, the output RF power gradually increases and once again reaches a peak near 20 GHz.

On the other hand, the signal subjected to phase modulation has a trend opposite to that of the signal subjected to intensity modulation. That is, the electrical output that was almost 0 near the direct current gradually increases each time the modulation frequency increases, and reaches a peak near the modulation frequency of 14 GHz.

This is because when optical transmission is performed, in the intensity modulation signal, a signal that originally has an amplitude component becomes a phase component near 14 GHz due to AM-PM conversion, and thus direct detection can no longer be performed. On the other hand, in the phase modification signal, the phase component is converted into an amplitude component due to PM-AM conversion during transmission, and thus reception is possible through direct detection. In this manner, the relationship between the electrical output and the magnitude after optical fiber transmission of the intensity modulation signal and the phase modulation signal is a complementary relationship in which the phase modulation signal reaches 0 when the intensity modulation signal reaches its peak, and the intensity modulation signal conversely reaches 0 when the phase modulation signal reaches its peak. This relationship always holds true, regardless of the distance of the optical fiber. If this property is used, a multi-carrier channel in which intensity modulation signals attenuate are allocated to the phase modulator 15, subjected to phase modulation, and the signals output from the modulators are multiplexed, whereafter by performing transmission with the optical fiber, signals in a broadband can be obtained without changing the normal receiver configuration.

By inputting the distances of the transmission paths between the transmitting station (or OLT) and the receiving stations (or ONUs) to the band allocation unit 31 in advance, it is possible to predict bands in which signal degradation will be prominent. That is, as shown in FIG. 3, an operation is performed in which the channels used by the receiving stations (or ONUs) for which it is predicted that quality degradation will be prominent due to intensity modulation are allocated to the phase modulator 15 according to the pre-input distances of the transmission paths of the transmitting station (or OLT) and the receiving stations (or ONUs). On the other hand, a operation is performed in which the channels used by the receiving stations (or ONUs)

for which it is predicted that quality degradation will be prominent due to phase modulation are allocated to the intensity modulator 13.

Figure 4A:
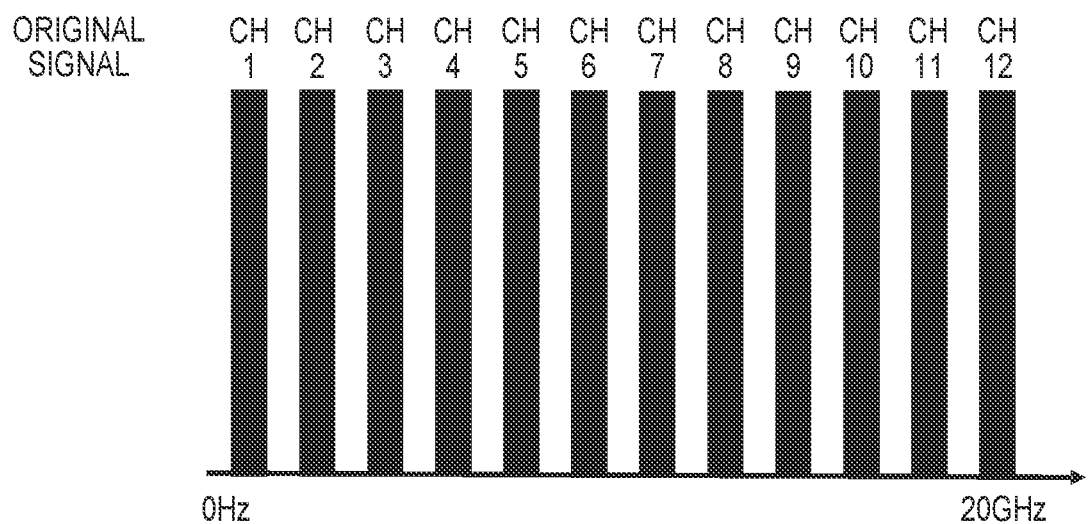
FIG. 4A is a diagram showing an example of allocation of 0 to 20-GHz multi-carrier channels to an intensity modulator and a phase modulator in 20-km transmission.
Figure 4B:
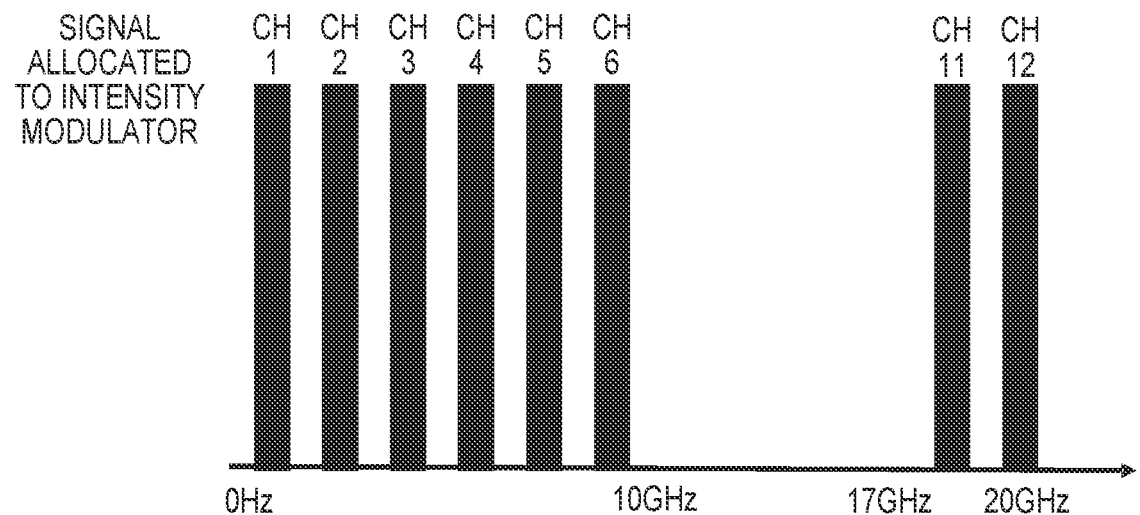
FIG. 4B is a diagram showing an example of allocation of 0 to 20-GHz multi-carrier channels to an intensity modulator and a phase modulator in 20-km transmission.
Figure 4C:
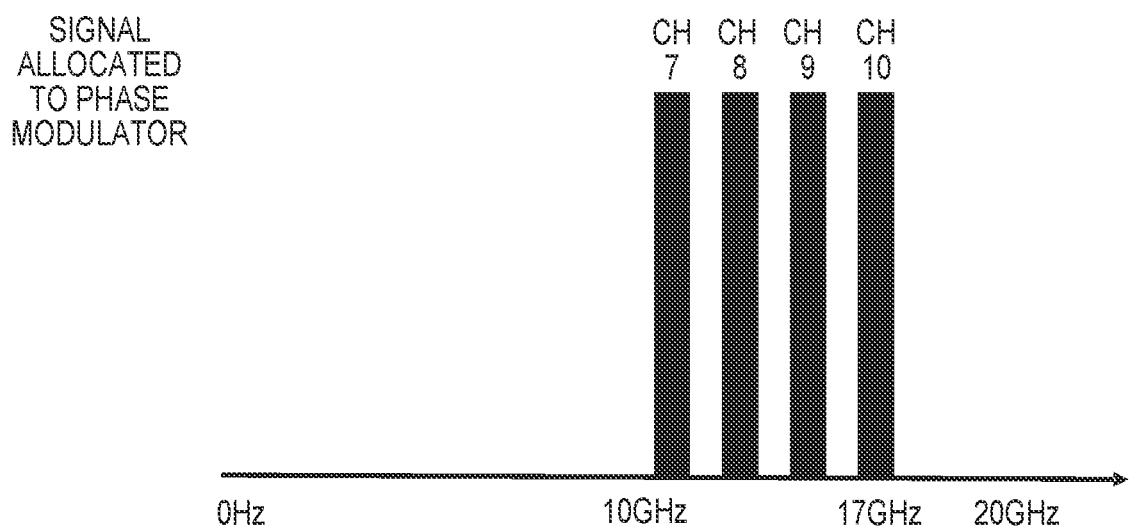
FIG. 4C is a diagram showing an example of allocation of 0 to 20-GHz multi-carrier channels to an intensity modulator and a phase modulator in 20-km transmission.

FIGS. 4A to 4C are diagrams showing examples of allocation of 0 to 20-GHz multi-carrier channels to an intensity modulator and a phase modulator in 20-km transmission. In this example, in the conventional method in which there are 12 channels in total and only the intensity modulator is used, the channel quality of the 7th to 10th channels degrades due to wavelength dispersion. If the channels that degrade are not allocated to the intensity modulator but are allocated to the phase modulator, the phase modulation component in this band can be exactly converted into an amplitude modulation component and detection of the signal can be performed, and therefore all of the channels can be used.

In this manner, according to the present embodiment, allocation of the suitable channels to the intensity modulator and the phase modulator is performed for each receiving station (or ONU), and thus wavelength dispersion can be suppressed without using a dispersion compensator.

Second Embodiment

Figure 5:
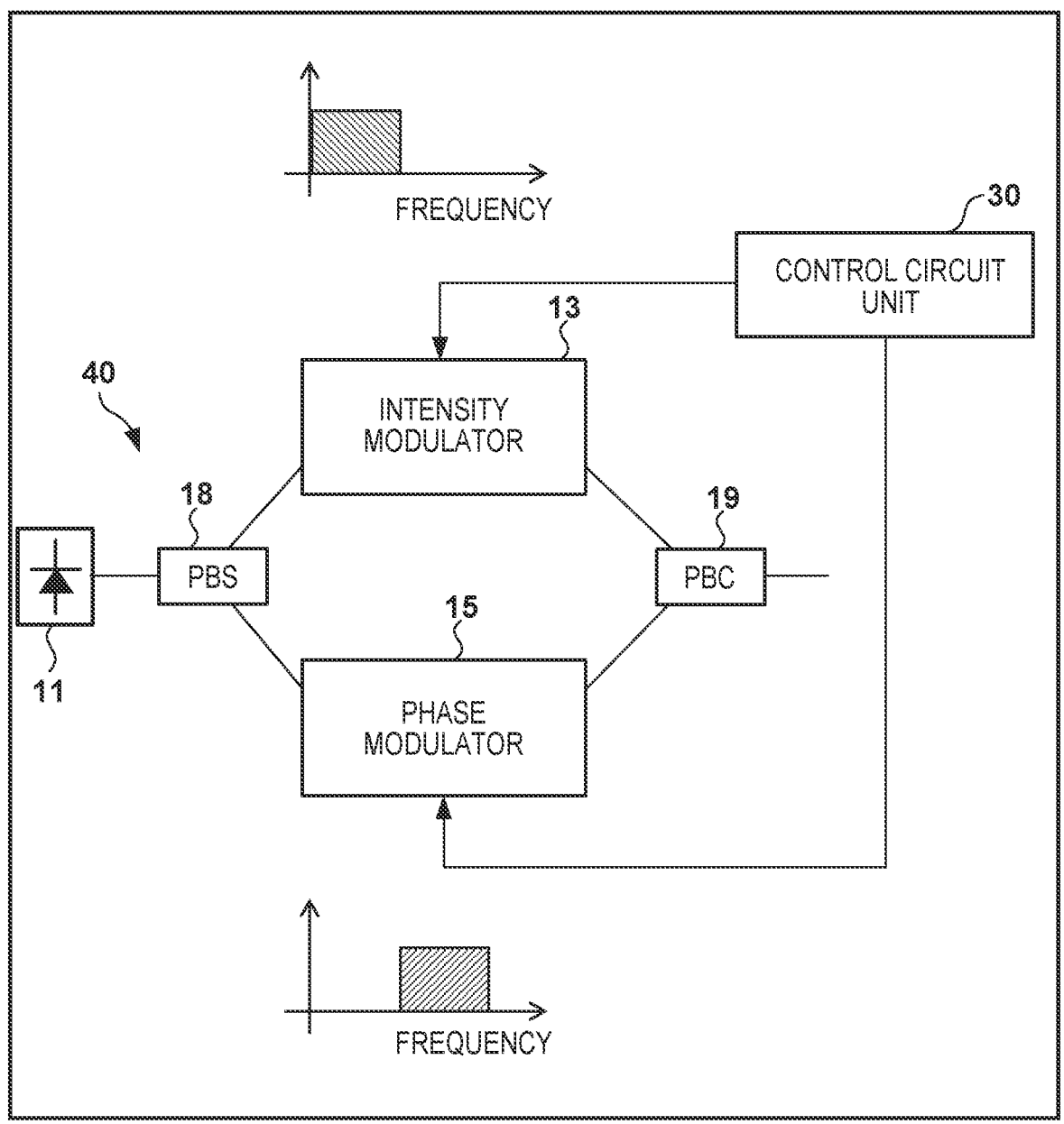
FIG. 5 is a diagram showing an overall configuration of an optical transmitter according to a second embodiment.

FIG. 5 is a diagram showing an overall configuration of an optical transmitter according to a second embodiment. The optical transmitter 40 is provided in a transmitting station in the optical transmission system or an OLT in a PON system and includes at least: a semiconductor laser 11, which is a light source that outputs light; a polarization beam splitter (PBS) 18; an intensity modulator 13; a phase modulator 15; a polarization beam combiner (PBC) 19; and a control circuit unit 30.

The polarization beam splitter 18 performs polarization separation of a received signal, and dividing the received signal into a first continuous light and a second continuous light whose polarization planes are orthogonal to each other. The intensity modulator 13 performs intensity modulation on the first continuous light. The phase modulator 15 performs phase modulation on the second continuous light. The polarization beam combiner 19 performs processing for multiplexing polarized waves that are orthogonal to each other and have been output from the intensity modulator 13 and the phase modulator 15. The light output from the semiconductor laser 11 is split into two lights, modulated by the modulators, and is thereafter re-combined, but there is a possibility that at that time, the lights of the two optical paths will interfere each other, that is, cause polarization cross-talk, and will appear as noise on the receiving side. However, by using the configuration of the second embodiment, it is possible to suppress the occurrence of polarization cross-talk.

Third Embodiment

Figure 6:
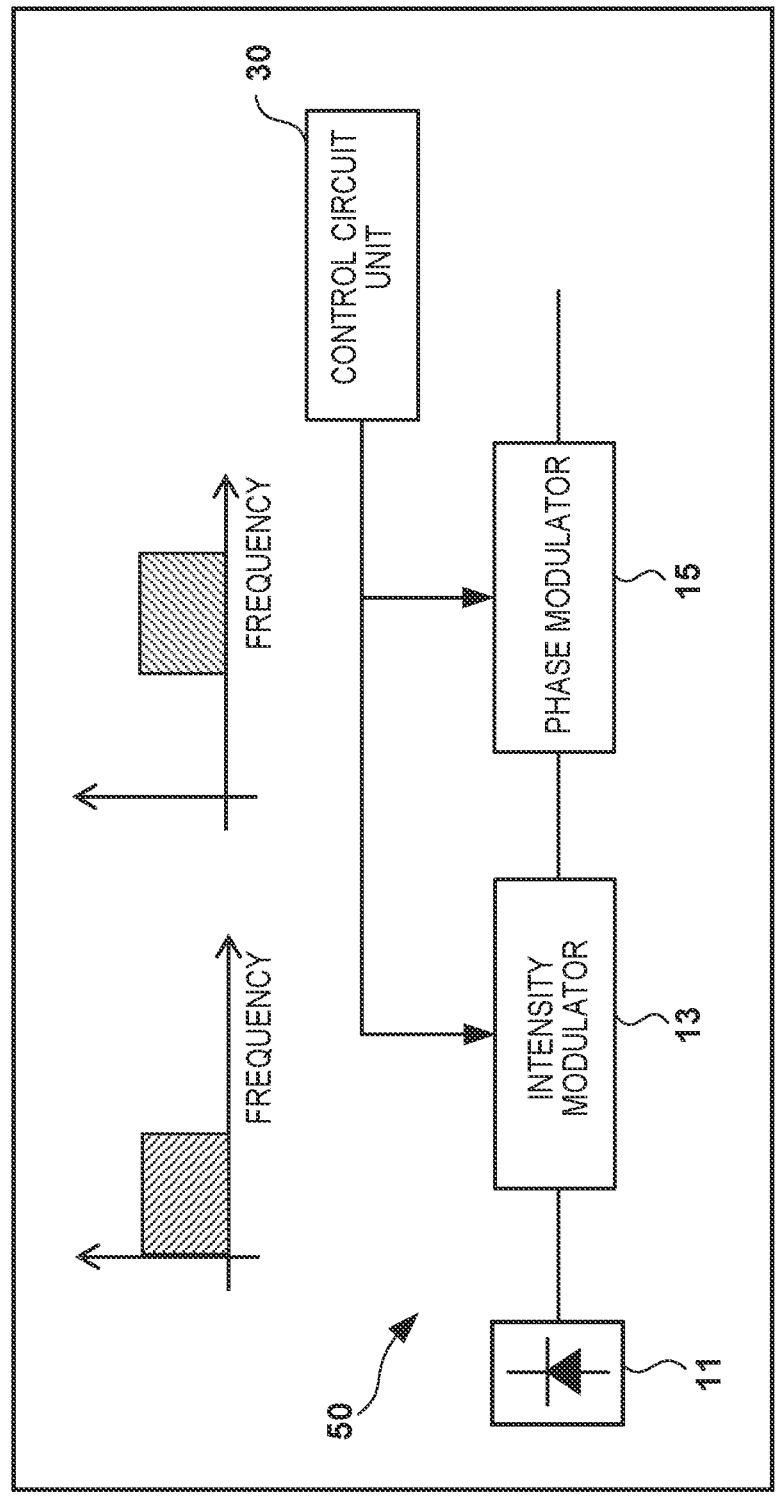
FIG. 6 is a diagram showing an overall configuration of an optical transmitter according to a third embodiment.

FIG. 6 is a diagram showing an overall configuration of an optical transmitter according to a third embodiment. The optical transmitter 50 is provided in a transmitting station in an optical transmission system or an OLT in a PON system, and as shown in FIG. 6, the intensity modulator 13 and the phase modulator 15 are arranged in series. The method for allocating the channels is the same as that of the first embodiment and the second embodiment, but arranging the intensity modulator 13 and the phase modulator 15 in series eliminates the need for optical devices such as a coupler, a PBS, and a PBC, and thus cost can be suppressed.

Fourth Embodiment

Figure 7:
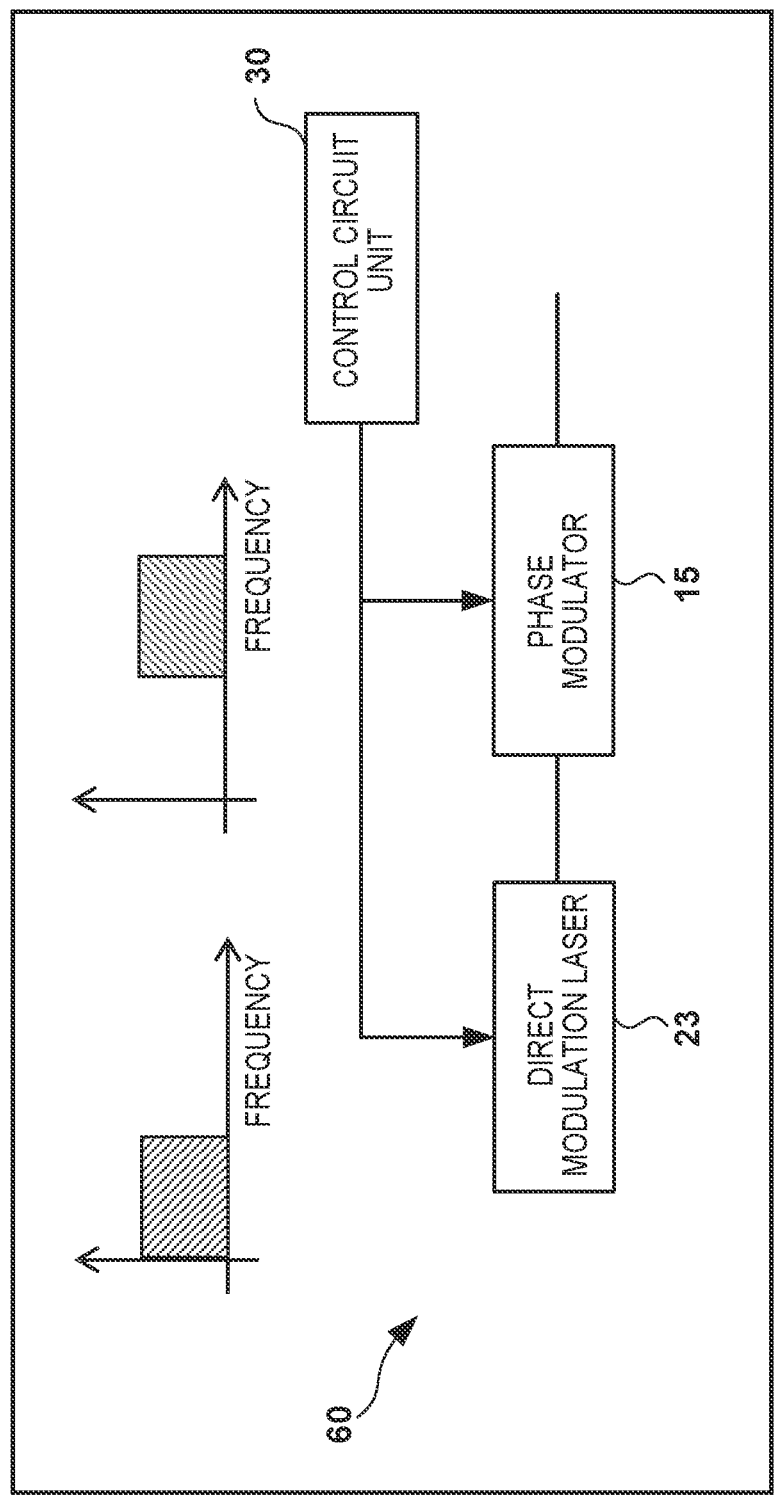
FIG. 7 is a diagram showing an overall configuration of an optical transmitter according to a fourth embodiment.

FIG. 7 is a diagram showing an overall configuration of an optical transmitter according to a fourth embodiment. As shown in FIG. 7, the optical transmitter 60 is provided in a transmitting station in an optical transmission system or an OLT in a PON system, and uses a direct modulation laser 23 in which a semiconductor laser and an intensity modulator are integrated. By using the direct modulation laser 23 in this manner, it is possible to further suppress the cost.

Fifth Embodiment

Figure 8:
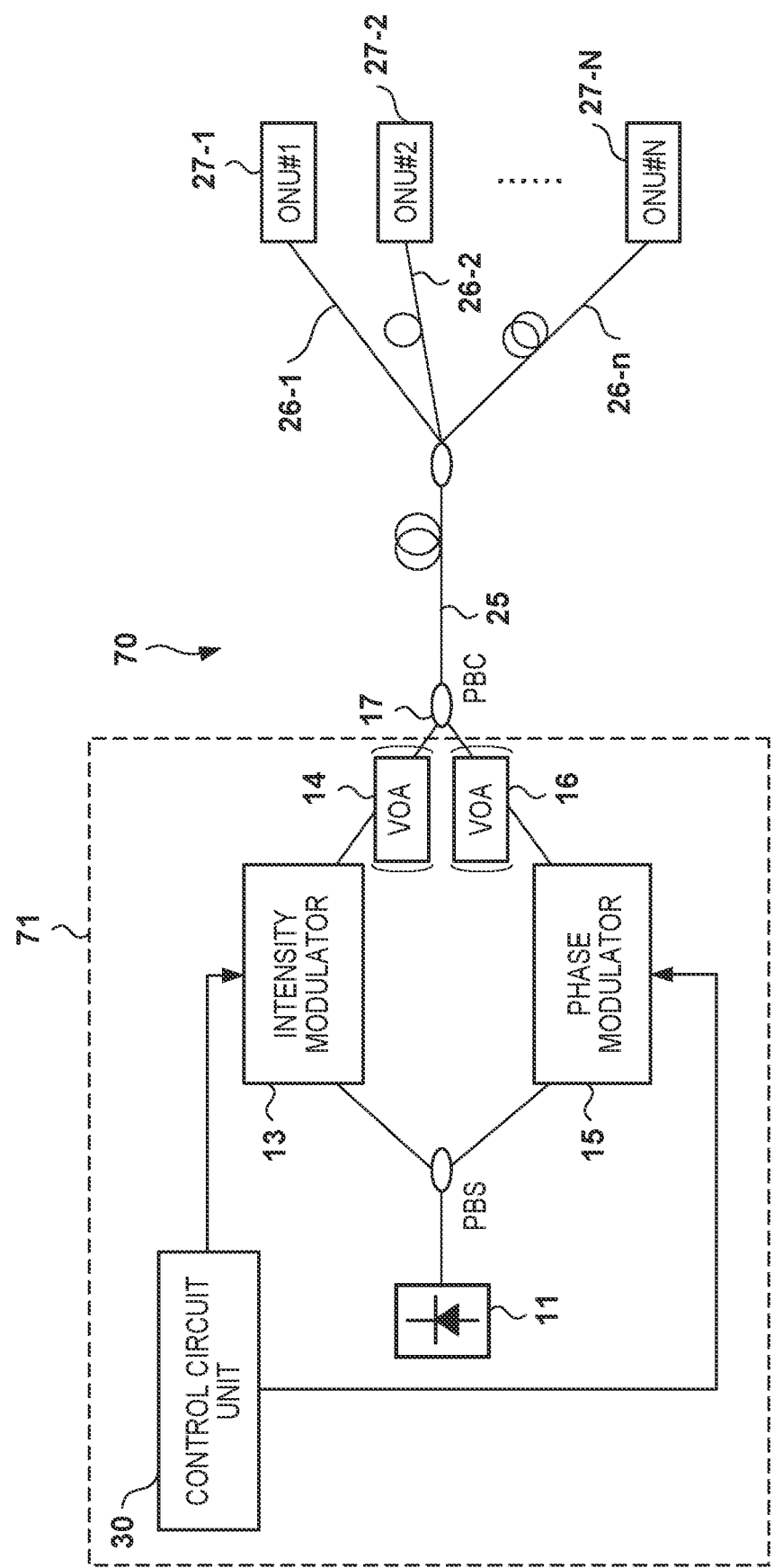
FIG. 8 is a diagram showing an overall configuration of a PON system according to a fifth embodiment.

FIG. 8 is a diagram showing an overall configuration of a PON system according to a fifth embodiment. Here, an optical transmitter according to the first to fourth embodiments has been applied to an OLT 71 of a PON system 70. The optical signal output from the optical transmitter is input to ONUs 27-1 to 27-N via optical fibers 25 and 26-1 to 26-*n*. The present invention can also be used in this kind of PtMP network. Since the distances from the OLT 71 to the ONUs 27-1 to 27-N differ, with fixed dispersion compensation, it is not possible to handle paths with different cumulative dispersion amounts. With a WDM-PON, OFDM-PON, or the like, in which different bands are used by the ONUs 27-1 to 27-N, control needs to be performed with regard to time such that collision with bands used by other ONUs does not occur, while avoiding the bands that cannot be used by the ONUs. Accordingly, one user cannot always keep using one band. Note that in this PON system, a DMT (dispersion multi-tone) scheme is applied, the number of channels is less than the number of ONUs, and the transmission distance differs for each ONU.

Incidentally, it is assumed that in a state in which only a normal intensity modulator is used, in a region to which a certain ONU is to be allocated, dispersion-induced RF power fading occurs due to the wavelength dispersion amount accumulated in optical fiber transmission between the OLT and ONUs, and the quality of the channel in that band degrades prominently. However, the quality in this kind of channel can be improved by using a phase modulation signal. By switching the modulator from an intensity modulator to a phase modulator, it is possible to prevent signal degradation. Accordingly, even if band allocation is performed in a fixed manner for a user, dispersion-induced RF power fading does not occur in one of the intensity modulator and the phase modulator, and therefore if one of the modulators is used, it is possible to perform transmission in which a constant quality is always maintained.

The determination of whether a channel to an ONU is to be allocated to the intensity modulator or the phase modulator is performed by a control circuit that has found out the transmission distances from the OLT to all of the ONUs in advance. That is, as shown in FIG. 2, the band allocation unit 31 determines whether original signals addressed to the ONUs are to be allocated to the intensity modulator or to the phase modulator based on information on the distances of the transmission paths and the modulation band. In this manner, by determining the allocation bands of the ONUs in a fixed manner and allocating them to one of an intensity modulator and a phase modulator, communication can be performed with all of the ONUs always occupying bands, and thus user throughput can be improved using a PON system in which conventional best-effort multi-carrier transmission is employed.

Sixth Embodiment

FIG. 9 is a diagram showing an overall configuration of an optical transmission system according to the present embodiment, and in particular shows an optical transmission system with a "Point to Multi Point" configuration. Here, an optical transmitter according to the first to fourth embodiments has been applied to a transmitting station 81 of an optical transmission system 80. The optical signal output from the optical transmitter is input to receiving stations 28-1 to 28-N via optical fibers 25 and 26-1 to 26-n. The present invention can also be used in this kind of PtMP network. Note that in this optical transmission system, it is assumed that a DMT (dispersion multi-tone) scheme or broadband (using multiple channels) transmission scheme is applied. Also, transmission is performed using all bands or multiple bands. The transmitting station 81 does not perform transmission at the same time as the multiple receiving stations, and the transmission distance from the transmitting station 81 is different for each receiving station. In the present embodiment, each time the transmitting station 81 switches the receiving station, the band allocation circuit dynamically allocates intensity modulation or phase modulation for each sub-carrier.

It is assumed that in a state in which only a normal intensity modulator is used, in a band to which a certain receiving station is to be allocated, dispersion-induced RF power fading occurs due to the wavelength dispersion amount accumulated in optical fiber transmission between the transmitting station and the receiving station, and the quality of the channel in that band degrades prominently. However, as described above, the quality of this kind of band can be improved by using a phase modulation signal. By switching the modulator from an intensity modulator to a phase modulator, it is possible to prevent signal degradation. Accordingly, even if band allocation is performed in a fixed manner for a user, dispersion-induced RF power fading does not occur in one of the intensity modulator or the phase modulator, and therefore if one of the modulators is used, it is possible to perform transmission in which a constant quality is always maintained.

The determination of whether the channels to the receiving stations 28-1 to 28-N are to be allocated to the intensity modulator or the phase modulator is performed by a control circuit that has found out the transmission distances from the transmitting station 81 to all of the receiving stations 28-1 to 28-N in advance. That is, as shown in FIG. 2, the band allocation unit 31 determines whether original signals addressed to the receiving stations 28-1 to 28-N are to be allocated to the intensity modulator or to the phase modulator based on information on the distance of the transmission path and the modulation band. In this manner, by determining the allocation bands of the receiving stations 28-1 to 28-N in a fixed manner and allocating them to one of an intensity modulator and a phase modulator, communication can be performed with all of the receiving stations 28-1 to 28-N always occupying a band, and thus user throughput can be improved using a PON system in which conventional best-effort multi-carrier transmission is employed.

As described above, according to the present embodiment, by performing allocation of the suitable channels to the intensity modulator and the phase modulator, it is possible to suppress wavelength dispersion without using a dispersion compensator.

The present invention is not limited to the above embodiments, and various changes and modifications can be made within the sprit and scope of the present invention. Therefore, to apprise the public of the scope of the present invention, the following claims are attached.

The invention claimed is:

1. An optical transmission system in which a transmitting station and a plurality of receiving stations are connected via an optical splitter, wherein
   the transmitting station includes:
   a controller configured to determine whether to perform intensity modulation or phase modulation on optical signals based on information on transmission distances to the receiving stations and modulation bands;
   an intensity modulator configured to perform intensity modulation on an optical signal; and
   a phase modulator configured to perform phase modulation on an optical signal, and
   wherein one of an intensity modulation signal and a phase modulation signal is transmitted from the transmitting station to each of the receiving stations.

2. The optical transmission system according to claim 1, wherein
   the controller is further configured to determine that phase modulation is to be performed on the optical signal in a specific band including a frequency at which an optical signal subjected to intensity modulation and transmitted through an optical fiber can no longer be directly detected on a receiving side.

3. The optical transmission system according to claim 1, wherein
   the controller is further configured to determine that intensity modulation is to be performed on the optical signal in a specific band including a frequency at which an optical signal subjected to phase modulation and transmitted through an optical fiber can no longer be directly detected on a receiving side.

4. The optical transmission system according to claim 1, wherein
   the intensity modulator and the phase modulator are connected in parallel, and light generated by a single light source is split and the resulting lights are respectively input to the intensity modulator and the phase modulator, and
   the controller is further configured to perform modulation by switching one of the intensity modulator and the phase modulator based on the information on the transmission distances to the receiving stations and the modulation bands.

5. The optical transmission system according to claim 1, wherein
   the intensity modulator and the phase modulator are connected in parallel, and lights generated by two independent light sources are respectively input to the intensity modulator and the phase modulator, and
   the controller is further configured to perform modulation by switching one of the intensity modulator and the phase modulator based on the information on the transmission distances to the receiving stations and the modulation bands.

6. The optical transmission system according to claim 1, wherein
   the intensity modulator and the phase modulator are connected in series, and light generated by a single light source is sequentially input to the intensity modulator and the phase modulator, and
   the controller is further configured to perform modulation using one of the intensity modulator and the phase modulator based on the information on the transmission distances to the receiving stations and the modulation bands.

7. The optical transmission system according to claim 6, wherein
the intensity modulator has the light source.

8. A PON (passive optical network) system in which an OLT (optical line terminal) and a plurality of ONUs (optical network units) are connected via an optical splitter, t wherein
the OLT includes:
a controller configured to determine whether to perform intensity modulation or phase modulation on optical signals based on information on transmission distances between the OLT and the ONUs and modulation bands;
an intensity modulator configured to perform intensity modulation on an optical signal; and
a phase modulator configured to perform phase modulation on an optical signal, and
wherein one of an intensity modulation signal and a phase modulation signal is transmitted from the OLT to each of the ONUs.

9. A transmission method for an optical transmission system in which a transmitting station and a plurality of receiving stations are connected via an optical splitter, comprising at least:
determining whether to perform intensity modulation or phase modulation on optical signals in the transmitting station, based on information on transmission distances to the receiving stations and modulation bands; and
performing one of intensity modulation and phase modulation on an optical signal,
wherein one of an intensity modulation signal and a phase modulation signal is transmitted from the transmitting station to each of the receiving stations.

* * * * *